(12) United States Patent
Ozdemir et al.

(10) Patent No.: US 10,031,247 B2
(45) Date of Patent: Jul. 24, 2018

(54) USING A ROTATION SENSOR MEASUREMENT TO ATTENUATE NOISE ACQUIRED BY A STREAMER-DISPOSED SENSOR

(75) Inventors: Ahmet Kemal Ozdemir, Asker (NO); Vidar Anders Husom, Asker (NO); Nicolas Goujon, Oslo (NO); Oeyvind Teigen, Oslo (NO); Lars Borgen, Sande (NO)

(73) Assignee: WESTERNGECO L.L.C., Houston, TX (US)

( * ) Notice: Subject to any disclaimer, the term of this patent is extended or adjusted under 35 U.S.C. 154(b) by 1301 days.

(21) Appl. No.: 12/369,124

(22) Filed: Feb. 11, 2009

(65) Prior Publication Data

US 2010/0202251 A1    Aug. 12, 2010

(51) Int. Cl.
*G01V 1/38* (2006.01)
*G01V 1/36* (2006.01)

(52) U.S. Cl.
CPC .............. *G01V 1/36* (2013.01); *G01V 1/3817* (2013.01); *G01V 2210/32* (2013.01); *G01V 2210/3246* (2013.01)

(58) Field of Classification Search
USPC ....................... 367/15, 20–25, 43, 45; 702/14
See application file for complete search history.

(56) References Cited

U.S. PATENT DOCUMENTS

| | | | |
|---|---|---|---|
| 3,252,339 A * | 5/1966 | Yen-Ti Huang | 74/5.6 D |
| 6,512,980 B1 | 1/2003 | Barr | |
| 7,347,096 B2 * | 3/2008 | Vrcelj | 73/514.17 |
| 7,466,625 B2 | 12/2008 | Robertsson et al. | |
| 7,616,522 B2 * | 11/2009 | Rouquette | G01V 1/20 367/154 |
| 2005/0194201 A1 * | 9/2005 | Tenghamn et al. | 181/112 |
| 2006/0239117 A1 * | 10/2006 | Singh | G01V 1/3808 367/20 |
| 2006/0245300 A1 * | 11/2006 | De Kok | G01V 1/16 367/15 |
| 2007/0297287 A1 * | 12/2007 | Robertsson | G01V 1/201 367/24 |
| 2008/0049551 A1 | 2/2008 | Muyzert et al. | |
| 2008/0219095 A1 | 9/2008 | Perciot et al. | |
| 2008/0270035 A1 | 10/2008 | Ozdemir et al. | |
| 2008/0285530 A1 | 11/2008 | Dietrich et al. | |
| 2008/0291779 A1 | 11/2008 | Muyzert et al. | |

FOREIGN PATENT DOCUMENTS

| | | | | |
|---|---|---|---|---|
| CN | 1924614 A | 3/2007 | | |
| WO | WO 2005073758 A1 * | 8/2005 | ........... | G01V 1/3808 |
| WO | WO-2005073758 A1 * | 8/2005 | ........... | G01V 1/3808 |

OTHER PUBLICATIONS

PCT Search Report, dated Nov. 27, 2010, Application No. PCT/US2010/023235.

(Continued)

*Primary Examiner* — Krystine E Breier

(57) ABSTRACT

A technique includes receiving data indicative of a first measurement acquired by a rotation sensor on a seismic streamer and based on the first measurement, estimating a torque noise present in a measurement acquired by a second sensor on the streamer. The technique includes attenuating the torque noise based on the estimate.

11 Claims, 7 Drawing Sheets

(56) References Cited

OTHER PUBLICATIONS

Office action for the equivalent Chinese patent application No. 201080011935.X dated May 6, 2013.
European search report for the equivalent European patent application No. 10741581.2 dated Apr. 7, 2014.
Examination Report issued for the equivalent Australian patent application No. 2010213986 dated Jun. 25, 2014.
Office action for the equivalent Chinese patent application No. 201080011935.X dated Dec. 31, 2015.

* cited by examiner

USING A ROTATION SENSOR MEASUREMENT TO ATTENUATE NOISE ACQUIRED BY A STREAMER-DISPOSED SENSOR

BACKGROUND

The invention generally relates to using a rotation sensor measurement to attenuate noise acquired by a streamer-disposed sensor.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes receiving data indicative of a first measurement acquired by a rotation sensor on a seismic streamer and based on the first measurement, estimating a torque noise present in a particle motion measurement acquired by a second sensor on the streamer. The technique includes attenuating the torque noise based on the estimate.

In another embodiment of the invention, a technique includes receiving data indicative of a first measurement acquired by a rotation sensor on a seismic streamer and estimating a vibration noise present in an alignment measurement acquired by a second sensor on the streamer based on the first measurement. The technique includes attenuating the vibration noise based on the estimate.

In another embodiment of the invention, a system includes a seismic streamer, which includes a rotation sensor and a second sensor. The second sensor is adapted to acquire a first measurement, and the rotation sensor is adapted to acquire a second measurement, which is indicative of a noise present in the first measurement.

In yet another embodiment of the invention, processing system includes an interface and a processor. The interface receives data indicative of a first measurement acquired by a rotation sensor on a seismic streamer. The processor processes the data to, based on the first measurement, determine an estimate of a noise present in a second measurement acquired by a second sensor on the streamer and attenuate the noise present in the second measurement based on the estimate.

Advantages and other features of the invention will become apparent from the following drawing, description and claims.

DETAILED DESCRIPTION

Figure 1:
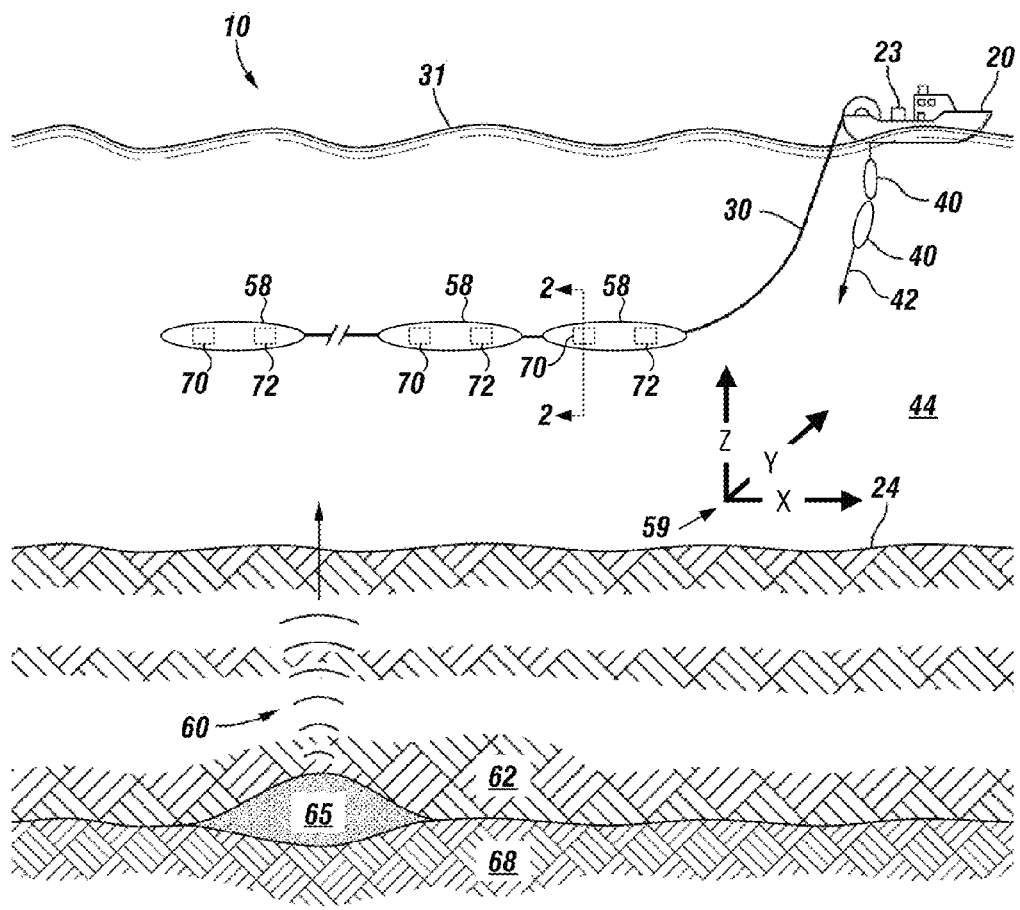
FIG. 1 is a schematic diagram of a marine seismic acquisition system according to an embodiment of the invention.

FIG. 1 depicts an embodiment 10 of a marine-based seismic data acquisition system in accordance with some embodiments of the invention. In the system 10, a survey vessel 20 tows one or more seismic streamers 30 (one exemplary streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. The streamers 30 contain seismic sensor units 58, which may include, depending on the particular embodiment of the invention, hydrophones (as one non-limiting example) to acquire pressure data or multi-component sensors. For embodiments of the invention in which the sensors 58 are multi-component sensors (as another non-limiting example), each sensor is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular seismic sensor unit 58 may include at least one particle motion sensor 70 for purposes of measuring a component of particle motion along a particular sensitive axis 59 (the x, y or z axis, for example). For example, the seismic sensor unit 58 may include a particle velocity sensor that is oriented to acquire a measurement of a particle velocity along the depth, or z, axis. Alternatively, the seismic sensor unit 58 may include a particle velocity sensor to sense a particle velocity along the crossline, or y, axis; a particle velocity sensor to sense a velocity along the inline, or x, axis; multiple particle velocity sensors to sense particle velocities along all three (x, y and z) axes; etc. Alternatively, in other embodiments of the invention, the particle motion sensor(s) of each seismic sensor unit 58 may sense a particle motion other than velocity (an acceleration, for example).

As described further below, a measurement acquired by a particle motion sensor 70 is susceptible to noise. For purposes of substantially canceling, or attenuating, this noise, the seismic sensor unit 58 includes a rotation sensor 72. More specifically, as further described below, the rotation sensor 72 measures a torque noise, which serves as a basis for estimating a noise (such as a torque noise, for example) that is present in the measurement that is acquired by the particle motion sensor 70. Given the estimate, the noise may be significantly removed, or attenuated.

In addition to the seismic sensor units 58, the marine seismic data acquisition system 10 also includes one or more seismic sources 40 (two exemplary seismic sources 40 being depicted in FIG. 1), such as air guns and the like. In some embodiments of the invention, the seismic source(s) 40 may be coupled to, or towed by, the survey vessel 20. Alternatively, in other embodiments of the invention, the seismic source(s) 40 may operate independently of the survey vessel 20, in that the source(s) 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source(s) 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the source(s) 40 produce corresponding reflected acoustic signals, or pressure waves 60, which are sensed by the seismic sensors of the seismic sensor unit 58. It is noted that the pressure waves that are received and sensed by the seismic sensors include "up going" pressure waves that propagate to the sensors without reflection, as well as "down going" pressure waves that are produced by reflections of the pressure waves 60 from an air-water boundary, or free surface 31.

The seismic sensors of the seismic sensor units 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular seismic sensor unit 58 may provide a trace, which corresponds to a measure of a pressure wavefield by its hydrophone; and the seismic sensor unit 58 may provide (depending on the particular embodiment of the invention) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a data processing system that may be, for example, located on land or on the vessel 20. An exemplary data processing system 320 is described below in connection with FIG. 8.

Figure 2:
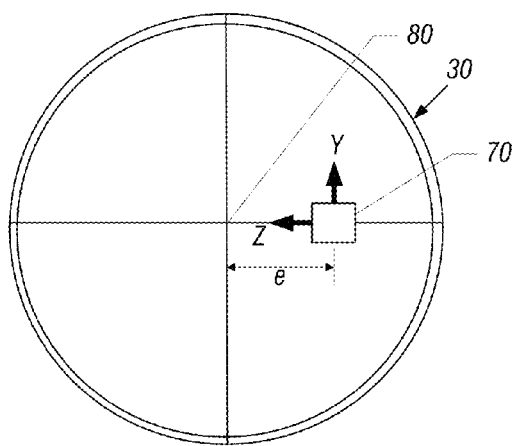
FIG. 2 is a cross-sectional view taken along line 2-2 of FIG. 1 according to an embodiment of the invention.

In a towed solid streamer, particle motion sensors typically acquire noise (in addition to the acquired particle motion signal). The noise is attributable to several types of noise sources: vibration noise, flow noise, acoustic noise, incoherent noise, etc. As depicted in a cross-section of the streamer 30 in FIG. 2, a particular particle motion sensor 70 may be positioned eccentrically with respect to a central axis 80 of the streamer cable. In other words, the particle motion sensor 70 may be positioned a distance (called "e" in FIG. 2) away from the cable's central axis 80. Due to this eccentric positioning, the particle motion sensor 70 is subject to rotation and thus, the particle motion measurement acquired by the particle motion sensor 70 contains noise that is attributable to this rotation. Because the noise is related to the rotation of the streamer cable about the inline axis (the x axis), the torque noise appear in the measured local crossline, or y, component of particle motion, but not in the measured local depth, or z, component of particle motion.

Figure 3:
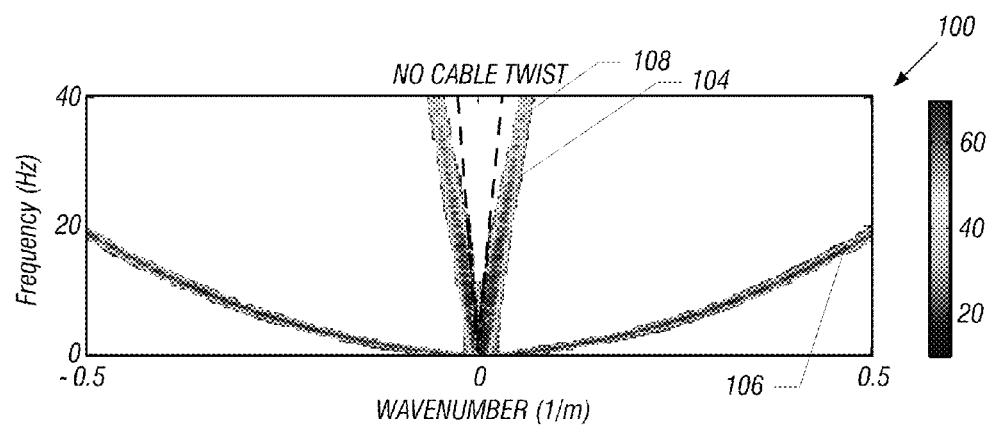
FIG. 3 is a frequency-wavenumber plot of a synthetically-generated noise record acquired by a streamer-disposed particle motion sensor with no cable twisting occurring in the streamer.

In general, the propagation of the torque noise is slower than the seismic signal and faster than the transversal vibration noise. More specifically, FIG. 3 depicts a frequency-wavenumber (f-k) plot 100 of a synthetically generated noise record acquired by a particle motion sensor when no twisting in the streamer cable occurs. As shown in the plot 100, the noise record includes transversal vibration noise 106 and torque noise 108. Also depicted in FIG. 3 is a cone 104 that defines the boundaries for the expected seismic signal. As can be seen in this particular example, the torque noise 108 contaminates mostly the lowest frequencies of the useful seismic frequency band.

Figure 4:
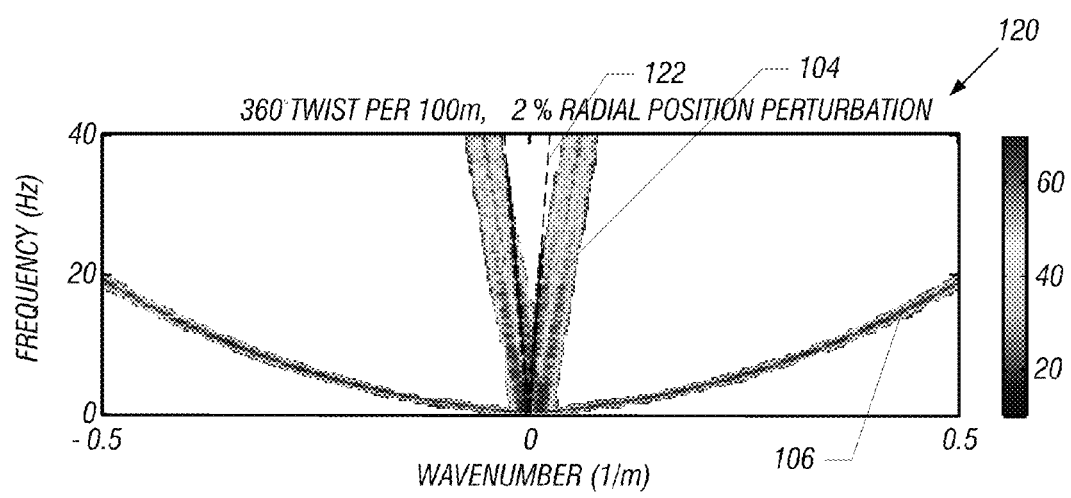
FIG. 4 is a frequency-wavenumber plot of a synthetically-generated noise record acquired by a streamer-disposed particle motion sensor with cable twisting occurring in the streamer.

FIG. 4 depicts an f-k plot 120 for a synthetically-generated noise record when cable twisting occurs. If there are smooth twists in the streamer cable between steering devices (such as twists caused by birds, for example), then the conversion of the acquired data from the local cable axes to global coordinates distributes the torque noise energy. More specifically, as shown in FIG. 4 for the example when the cable smoothly twists to make one full rotation at every 100 meters (m), the twisting distributes more of a torque noise 122, such that the torque noise 122 contaminates more of the signal cone 104 than for the scenario in which no cable twisting occurs (see FIG. 3, for example). Thus, when cable twisting occurs, the torque noise affects a larger portion of the frequency band of interest.

Figure 5:
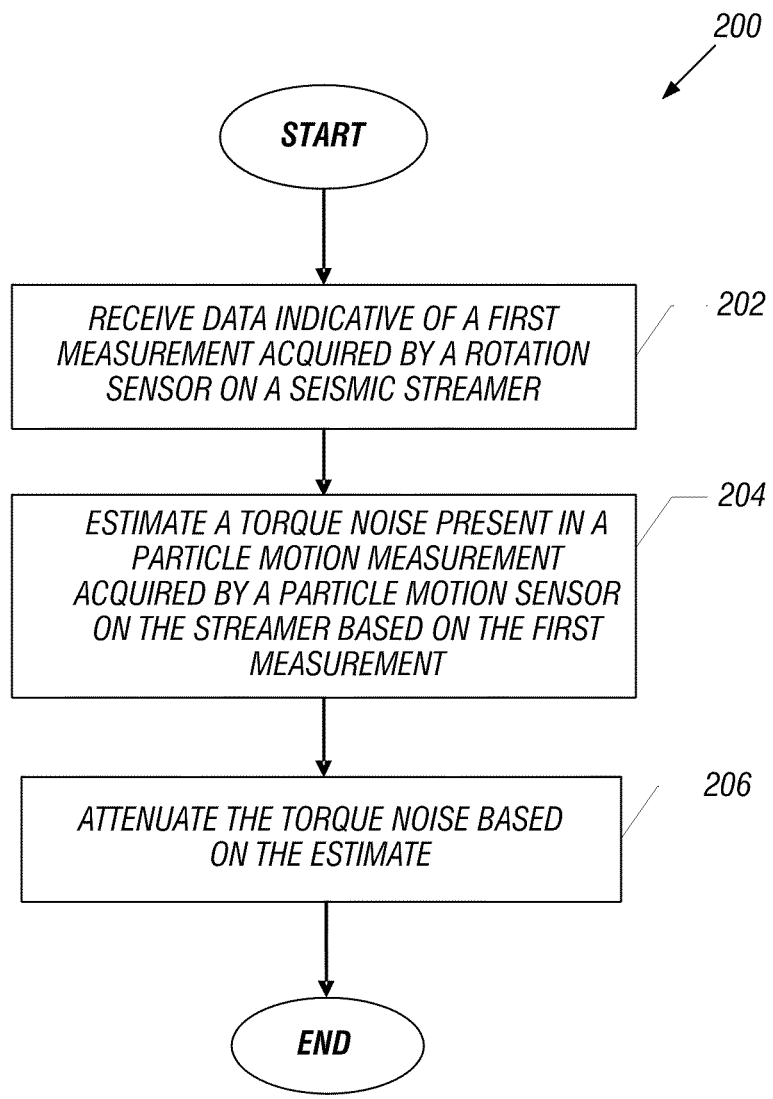
FIGS. 5 and 7 are flow charts illustrating techniques to use a rotation sensor measurement to attenuate noise acquired by another sensor according to embodiments of the invention.

For purposes of substantially canceling, or attenuating, the torque noise from the particle motion measurement, a technique 200 that is depicted in FIG. 5 may be used in accordance with embodiments of the invention. Pursuant to the technique 200, data is received indicative of a measurement acquired by a rotation sensor on a seismic streamer, pursuant to block 202. Based on the measurement, an estimate of a torque noise present in a particle motion measurement acquired by a particle motion sensor on the streamer is determined, pursuant to block 204. The torque noise is attenuated, pursuant to block 206, based on the estimate.

More specifically, in accordance with embodiments of the invention, the measurement acquired by the rotation sensor 72 (see FIG. 1) is generally insensitive to the seismic signal and as such, serves as a reference measurement for estimating the torque noise in the particle motion measurement acquired by the particle motion sensor 70. The insensitivity of the rotation sensor to the seismic signal ensures that signal cancellation does not occur during the adaptive subtraction process.

Turning now to a more specific example, which illustrates one way to attenuate torque noise in a particle velocity measurement, in the following discussion, "$V_{y,k}(nT)$" refers to the crossline, or y, component of a particle velocity measurement, i.e., the measurement that contains the torque noise to be attenuated. Torque noise is attenuated based on a rotation sensor measurement, which is called "$R_k(nT)$" herein. In this notation, "T" denotes the sampling interval, and "n" denotes the sample number.

In general, the particle velocity measurement $V_{y,k}(nT)$ may be decomposed into three components: the seismic signal component (called "$S_{y,k}(nT)$" herein); the torque noise component (called "$\tau_k(nT)$" herein); and the non-torque noise component (called "$N_{y,k}(nT)$" herein), which is attributable to vibration noise, acoustic noise, etc. Mathematically, the particle motion measurement $V_{y,k}(nT)$ may be described in terms of these components as follows:

$$V_{y,k}(nT)=S_{y,k}(nT)+N_{y,k}(nT)+\tau_k(nT) \qquad \text{Eq. 1}$$

The objective is to estimate and to remove the torque noise $\tau_r(t)$ from measurement $V_{y,k}(t)$ by using the rotation sensor measurement $R_k(t)$.

In accordance with some embodiments of the invention, the transfer function used to estimate the torque noise component in the particle motion measurement may be determined in terms of the eccentricity and sensitivity of the particle motion sensor. In these embodiments of the invention, the torque noise may be estimated and subtracted from the particle motion measurement using the determined transfer function.

In embodiments of the invention in which there is an unknown transfer function between the torque noise and the rotation sensor measurement, direct subtraction might amplify the torque noise rather than cancel it from the particle motion measurement. For these embodiments of the invention, the transfer function that relates the rotation sensor measurement to the torque noise is estimated by using the acquired data. As a non-limiting example, one way to estimate the transfer function using the acquired data is described below. However, it is understood that other ways may be used to estimate the transfer function, in accordance with other embodiments of the invention.

In the exemplary technique to estimate the transfer function, the transfer function may be modeled as a linear filter, as described below:

$$\hat{\tau}_k(nT) = \sum_{m=1}^{M} h_m R_k(nT - mT), \qquad \text{Eq. 2}$$

where "$h_m$" represents the coefficients of the linear filter. The filter coefficients $h_m$ may be determined by noting that the particle motion measurement is corrected as follows:

$$\hat{V}_{y,k}(nT)=V_{y,k}(nT)-\hat{\tau}_k(nT). \qquad \text{Eq. 3}$$

Using this recognition, one way to estimate the filter coefficients $h_m$ is to minimize the mean-square-energy of the corrected particle motion measurement, by minimizing the following cost function:

$$J = E[\hat{V}_{y,k}(nT)]^2 \qquad \text{Eq. 4}$$
$$= E[\hat{V}_{y,k}(nT) - \hat{\tau}_k(nT)]^2,$$

where E[ ] denotes the statistical expectation operator.

The cost function of Eq. 4 is minimized when the filter coefficients satisfy the normal equations, as set forth below:

$$C_R h = C_{VR}, \qquad \text{Eq. 5}$$

where "h" represents the vector of filter coefficients, as set forth below:

$$h(m)=h_m. \qquad \text{Eq. 6}$$

In Eq. 5, "$C_R$" represents the auto correlation matrix of the rotation sensor measurements, as set forth below:

$$C_R(m,n)=E[R_k(nT)R_k(mT)]. \qquad \text{Eq. 7}$$

Additionally, in Eq. 5, "$C_{VR}$" represents the cross correlation matrix of the rotation sensor measurements and the particle velocity measurements, as set forth below:

$$C_{VR}(m,n)=E[V_{y,k}(nT)R_k(mT)]. \qquad \text{Eq. 8}$$

Assuming that the signal $S_{y,k}(t)$ and non-torque noise $N_{y,k}(nT)$ are uncorrelated with the torque noise $\tau_k(t)$ and the rotation sensor measurement $R_k(t)$, the cross correlation that is set forth in Eq. 8 is equivalent to cross correlation of the torque noise and rotation sensor measurement, as set forth below:

$$C_{VR}(m, n) = E[\tau_k(nT)R_k(mT)] \qquad \text{Eq. 9}$$
$$= C_{\tau R}(m, n).$$

Given this relationship, the filter coefficients (i.e., the transfer function) may be derived, as described below:

$$h = C_R^{-1} C_{\tau R}. \qquad \text{Eq. 10}$$

As set forth in Eq. 10, the filter coefficients depend only on the statistics of the rotation sensor measurement and the torque noise. In practice, the transfer function will be time-varying for non stationary noise. In this case, an adaptive interference cancellation filter, such as a least mean squares (LMS), recursive least squares (RLS) or QR decomposition-based recursive least squares (QR-RLS) may be used. More specifically, in accordance with some embodiments of the invention, an adaptive noise cancellation system 250 may be used, which is depicted in FIG. 6.

Figure 6:
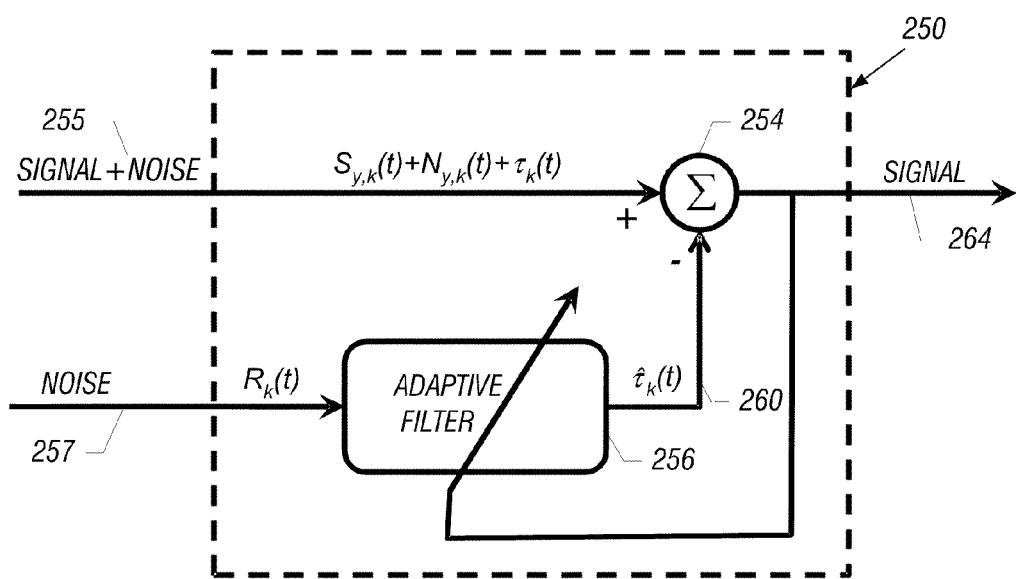
FIG. 6 is a schematic diagram illustrating an adaptive noise cancellation system according to an embodiment of the invention.

Referring to FIG. 6, an adder 254 of the system 250 receives a particle motion measurement, which includes the seismic signal and noise 255. The adder 254 subtracts an estimated torque noise 260 present in the particle motion measurement to produce a signal 264 that is substantially free of the torque noise component. An adaptive filter 256 of the system 250 adjusts based on the signal 264 and is applied to the noise 257 measured by the rotation sensor to derive the torque noise measurement 260.

Other embodiments of the invention are contemplated and are within the scope of the appended claims. For example, in accordance with some embodiments of the invention, the particle motion sensor 70 may be a microelectromechanical system (MEMS)-based capacitive sensor, which provides a direct current (DC) voltage that is indicative of an alignment of the particle motion sensor. This alignment may be used to, for example, determine an orientation of the local axes of the particle motion sensor and thus, may be useful for purposes of coordinate transformations. The DC signal that is provided by the sensor 70 may be subject to a relatively strong low frequency vibration noise (i.e., a translation noise), which introduces a vibration noise into the alignment measurement. Since the rotation sensor measurement will be highly correlated to the alignment measurement but insensitive to translation noise, the techniques that are described herein may be applied to remove the vibration noise component and thus, improve the overall signal-to-noise ratio (SNR) of the alignment measurement.

Figure 7:
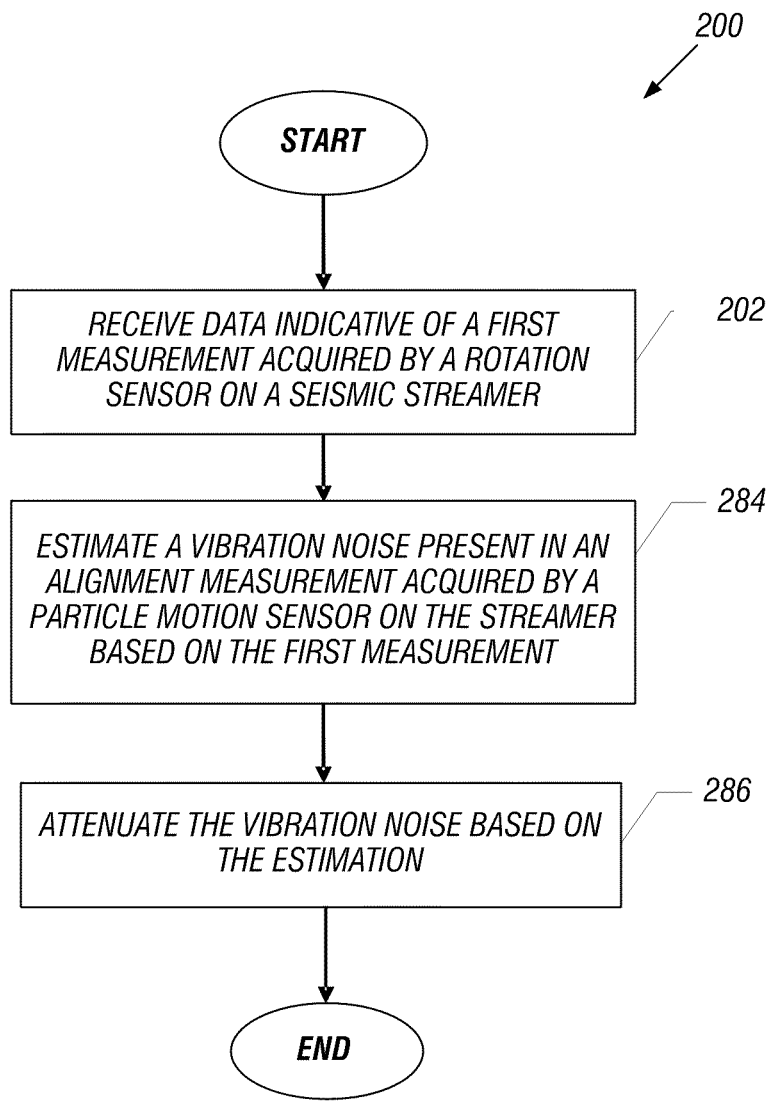

More specifically, referring to FIG. 7, in accordance with some embodiments of the invention, a technique 280 includes receiving data, which are indicative of a rotation measurement that is acquired by a rotation sensor on a seismic streamer, pursuant to block 282. Based on the rotation measurement, an estimate of a vibration noise present in an alignment measurement acquired by a particle motion sensor on the streamer is determined, pursuant to block 284. The technique 280 includes attenuating the vibration noise based on the estimate, pursuant to block 286.

Figure 8:
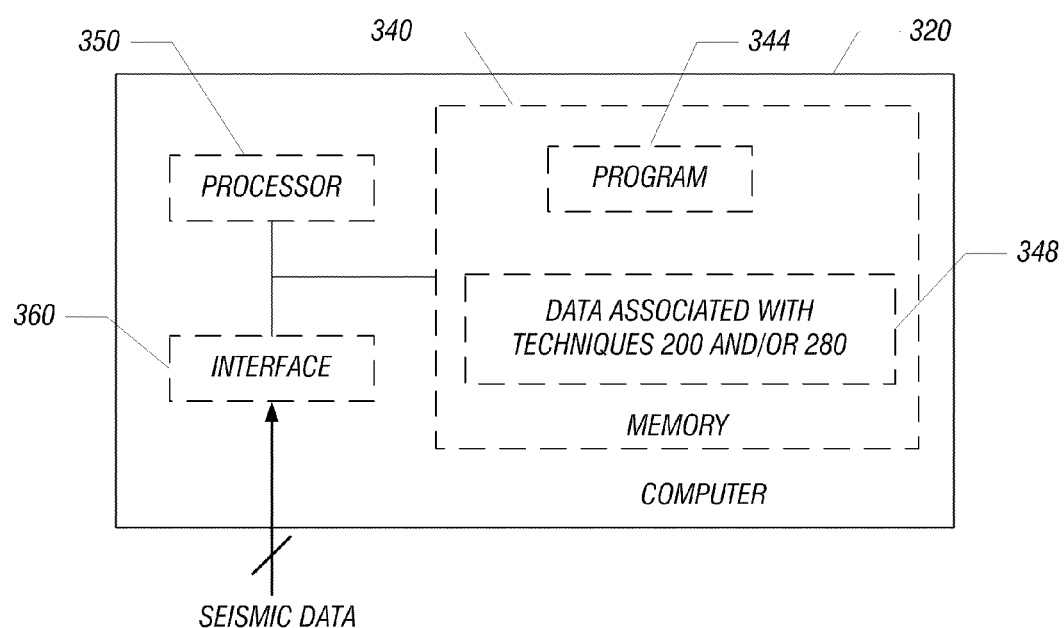
FIG. 8 is a schematic diagram of a processing system according to an embodiment of the invention.

Referring to FIG. 8, in accordance with some embodiments of the invention, a data processing system 320 contains a processor 350 that processes acquired seismic data to perform at least some parts of one or more of the techniques that are disclosed herein for such purposes (as non-limiting examples) as receiving measurements from streamer-disposed rotation sensors; estimating torque noise components present in streamer-disposed particle motion measurements based on the measurements acquired by the rotation sensors; receiving alignment measurements from streamer-disposed sensors; estimating vibration noise components in the alignment measurements based on measurements received from streamer-disposed rotation sensors; adaptively determining noise components present in particle motion and/or alignment measurements; determining filter coefficients of transfer functions to estimate noise components in particle motion and/or alignment measurements based on measurements acquired by rotation sensors; etc.

In accordance with some embodiments of the invention, the processor 350 may be formed from one or more microprocessors and/or microcontrollers. As non-limiting examples, the processor 350 may be located on a streamers 30 (see FIG. 1), located on the vessel 20 (see FIG. 1), distributed among multiple streamer 30, located at a land-based processing facility, distributed among separate land-based facilities, etc.

As depicted in FIG. 8, the processor 350 may be coupled to a communication interface 360 for purposes of receiving such data as acquired particle motion measurements, rotation sensor measurements, alignment measurements, pressure measurements, etc. As non-limiting examples, the communication interface 360 may be a Universal Serial Bus (USB) interface, a network interface, a removable media (such as a flash card, CD-ROM, etc.) interface or a magnetic storage interface (IDE or SCSI interfaces, as examples). Thus, the communication interface 360 may take on numerous forms, depending on the particular embodiment of the invention.

In accordance with some embodiments of the invention, the communication interface 360 may be coupled to a memory 340 of the system 320 and may store, for example, various input and/or output datasets involved in the techniques and systems described herein, such as the techniques 200 and/or 280 and/or system 250. The memory 340 may store program instructions 344, which when executed by the processor 350, may cause the processor 350 to perform various tasks of one or more of the techniques and systems that are disclosed herein and the system 320 may display preliminary, intermediate and/or final results obtained via the technique(s)/system(s) on a display device (not shown in FIG. 8) of the system 320, such as a computer monitor in accordance with some embodiments of the invention.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A system comprising:
   a seismic streamer comprising a longitudinal axis, a rotation sensor and a particle motion sensor,
   wherein:
      the rotation sensor for measuring torque comprises a measurement axis that is eccentrically offset with respect to the longitudinal axis of the seismic streamer;
      the rotation sensor measures the torque along the measurement axis of the rotation sensor;
      the particle motion sensor acquires a second measurement comprising a particle motion component and a torque noise component; and
      the torque measurement associated with the torque noise component such that an estimate of the torque noise component may be derived from the torque measurement.

2. The system of claim 1, wherein the particle motion sensor comprises a MEMS-based sensor.

3. The system of claim 1, further comprising:
   a vessel to tow the streamer.

4. The system of claim 1, further comprising:
   a processor to apply a transfer function relating the rotation measurement to the torque noise component to attenuate the torque noise component.

5. The system of claim 4, wherein the processor is located on the streamer.

6. A processing system comprising:
   an interface to receive first data representing a first torque measurement acquired by a rotation sensor on a seismic streamer and second data representing a second measurement acquired by a particle motion sensor on the seismic streamer, wherein the rotation sensor comprises a measurement axis that is eccentrically offset with respect to a longitudinal axis of the seismic sensor, and the second measurement comprises a particle motion component and a torque noise component; and
   a processor to:
      process the first data to apply a transfer function to the first torque measurement to estimate the torque noise component; and
      process the second data to attenuate the torque noise component of the second measurement based on the estimated torque noise component.

7. The processing system of claim 6, wherein the processor is adapted to adaptively filter the first measurement to estimate the torque noise.

8. The processing system of claim 6, wherein the processor adaptively determines the transfer function by minimizing a mean-square energy of a corrected particle motion measurement.

9. The processing system of claim 8, wherein the processor is adapted to determine coefficients of a linear filter to determine the transfer function.

10. A processing system comprising:
an interface to receive first data representing a first torque measurement acquired by a rotation sensor on a seismic streamer and second data representing a second measurement acquired by a sensor on the seismic streamer, wherein the rotation sensor comprises a measurement axis that is eccentrically offset with respect to a longitudinal axis of the seismic sensor, and the second measurement comprises a signal component and a torque noise component; and
a processor to:
process the first torque data to apply a transfer function to the first measurement to estimate the torque noise component;
process the second data to attenuate the torque noise component of the second measurement based on the estimated torque noise component; and
adaptively determine the transfer function by minimizing a mean-square energy of a corrected particle motion measurement.

11. A processing system comprising:
an interface to receive first torque data representing a first measurement acquired by a rotation sensor on a seismic streamer and second data representing a second measurement acquired by a sensor on the seismic streamer, wherein the rotation sensor comprises a measurement axis that is eccentrically offset with respect to a longitudinal axis of the seismic sensor, and the second measurement comprises a signal component and a torque noise component; and
a processor to:
process the first torque data to apply a transfer function to the first measurement to estimate the torque noise component;
process the second data to attenuate the torque noise component of the second measurement based on the estimated torque noise component; and
determine coefficients of a linear filter to determine the transfer function.

* * * * *